(12) United States Patent
Wannemacher et al.

(10) Patent No.: US 8,280,914 B2
(45) Date of Patent: Oct. 2, 2012

(54) SERVICE DESK INTERFACE

(75) Inventors: Eric Wannemacher, Heidelberg (DE); Joerg Stiller, Spicheren (FR); Hannes Oechsuer, Frankenthal (DE)

(73) Assignee: SAP AG, Walldorf (DE)

( * ) Notice: Subject to any disclaimer, the term of this patent is extended or adjusted under 35 U.S.C. 154(b) by 451 days.

(21) Appl. No.: 11/952,816

(22) Filed: Dec. 7, 2007

(65) Prior Publication Data

US 2008/0228692 A1 Sep. 18, 2008

Related U.S. Application Data

(60) Provisional application No. 60/873,879, filed on Dec. 7, 2006.

(51) Int. Cl.
*G06F 17/00* (2006.01)
(52) U.S. Cl. ........ 707/796; 707/688; 707/706; 707/791; 707/793; 707/830
(58) Field of Classification Search .................. 707/688, 707/706, 771, 791, 793, 796, 822, 830
See application file for complete search history.

(56) References Cited

U.S. PATENT DOCUMENTS

| | | | |
|---|---|---|---|
| 6,865,268 B1 * | 3/2005 | Matthews et al. | 379/265.09 |
| 7,076,727 B1 * | 7/2006 | Flam et al. | 715/202 |
| 7,676,034 B1 * | 3/2010 | Wu et al. | 379/265.01 |
| 2003/0172133 A1 * | 9/2003 | Smith et al. | 709/219 |
| 2005/0010461 A1 * | 1/2005 | Manos | 705/8 |
| 2005/0038855 A1 * | 2/2005 | Martin et al. | 709/206 |
| 2005/0053217 A1 * | 3/2005 | Reformato et al. | 379/211.01 |
| 2005/0278571 A1 * | 12/2005 | Auvenshine et al. | 714/25 |

* cited by examiner

*Primary Examiner* — Sana Al Hashemi
(74) *Attorney, Agent, or Firm* — Blakely, Sokoloff, Taylor & Zafman LLP

(57) ABSTRACT

Notification of a system incident is received at a first help desk system. In response, an incident record is generated and maintained for the system incident. The incident record includes incident data and a record identification (ID). The incident data and record ID are transmitted from the first help desk system to a second help desk system where a corresponding record is maintained. One of the help desks is assigned an exclusive status to process the system incident. Regardless of which help system is assigned the exclusive status to process the system incident, the incident record is closed at the first help desk system, which automatically triggers closing of the corresponding record in the second help desk system.

20 Claims, 6 Drawing Sheets

SERVICE DESK INTERFACE

This application is a non-Provisional of U.S. Provisional Application No. 60/873,879, filed on Dec. 7, 2006, entitled "SAP Solution Manager 4.0 Service Desk WebService API", and claims the benefit of priority thereto.

FIELD

Embodiments of the invention relate to information technology (IT) help/service desks and more particularly to a help desk interface for exchanging messages between help/service desk applications.

BACKGROUND

Help desks are often employed to help manage an information technology (IT) operation. The term "help desk" generally refers to an information and assistance resource that troubleshoots problems with computers, software, and similar products. A help desk is often the central point of contact between service providers and users/customers. Companies and organizations often provide help desk support to their customers while in-house help desks provide similar support specifically for employees.

The term "service desk" often refers to functionality associated with the integration of business processes into a service management infrastructure. Service desks often provide active monitoring of system incidents and user questions, as well as providing an interface for other activities such as customer change requests, third parties (e.g. maintenance contracts), and software licensing.

As used herein, the term "incident" refers to any event which is not part of the standard operation of a service and which causes, or may cause, an interruption or a reduction of the quality of the service. Incidents are frequently the result of failures or errors in the IT infrastructure. Thus, the objective of incident management (IM) is to restore normal operations as quickly as possible with the least possible impact on either the business providing the service or the user of the service.

The terms "service desk" and "help desk" are used interchangeably herein to refer to any IT functionality associated with incident management. Such functionality can include (in addition to the functionality described above) incident detection and recording, incident classification and initial support, incident investigation and diagnosis, incident resolution and recovery, incident closure, and incident ownership, tracking, monitoring and communication, etc.

Increasingly, companies and organizations rely on multiple computer and IT-related products, services and solutions to meet business needs. For example, a company might use enterprise software to model an entire business enterprise, while also using a variety of other third party applications to further enhance productivity. In addition, it is likely that the company runs the software using hardware from multiple vendors, etc. Each of these products and services may have an associated help desk system or tool (or simply, help desk) to help troubleshoot problems, exchange information, etc. However, traditional help desks cannot be integrated with other help desks. In other words, companies employing a variety of products and services are often forced to communicate in isolation with each of various help desks in order to solve a problem.

SUMMARY

A method and system for processing a system incident is described herein. The method and system facilitate integration of help desks, including integration of help desks from different vendors. A system incident is received at a first help desk. The incident can be received from a user or it can be received automatically. The first help desk generates and maintains an incident record for the system incident. An incident record includes incident data (e.g., data, information associated with and/or describing the incident) and a record identification (ID). The first help desk transmits the incident data and the record ID to a second help desk system (e.g., a third party help desk) where a corresponding record is maintained. The corresponding record incorporates the incident data and is linked to the original incident record by the record ID.

One of the two help desks is assigned an exclusive status to process (e.g., investigate, resolve, etc.) the system incident. In other words, only one help desk can be processing the incident at any given time. However, the exclusive processing status can be transferred from one help desk to the other. Once processing is complete (e.g., the incident has been resolved) the incident record is closed by the help desk that originally generated the incident record. Only the help desk that creates the incident record can close the incident record. Closing the incident record in the first help desk automatically triggers closure of the corresponding record in the second help desk system.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
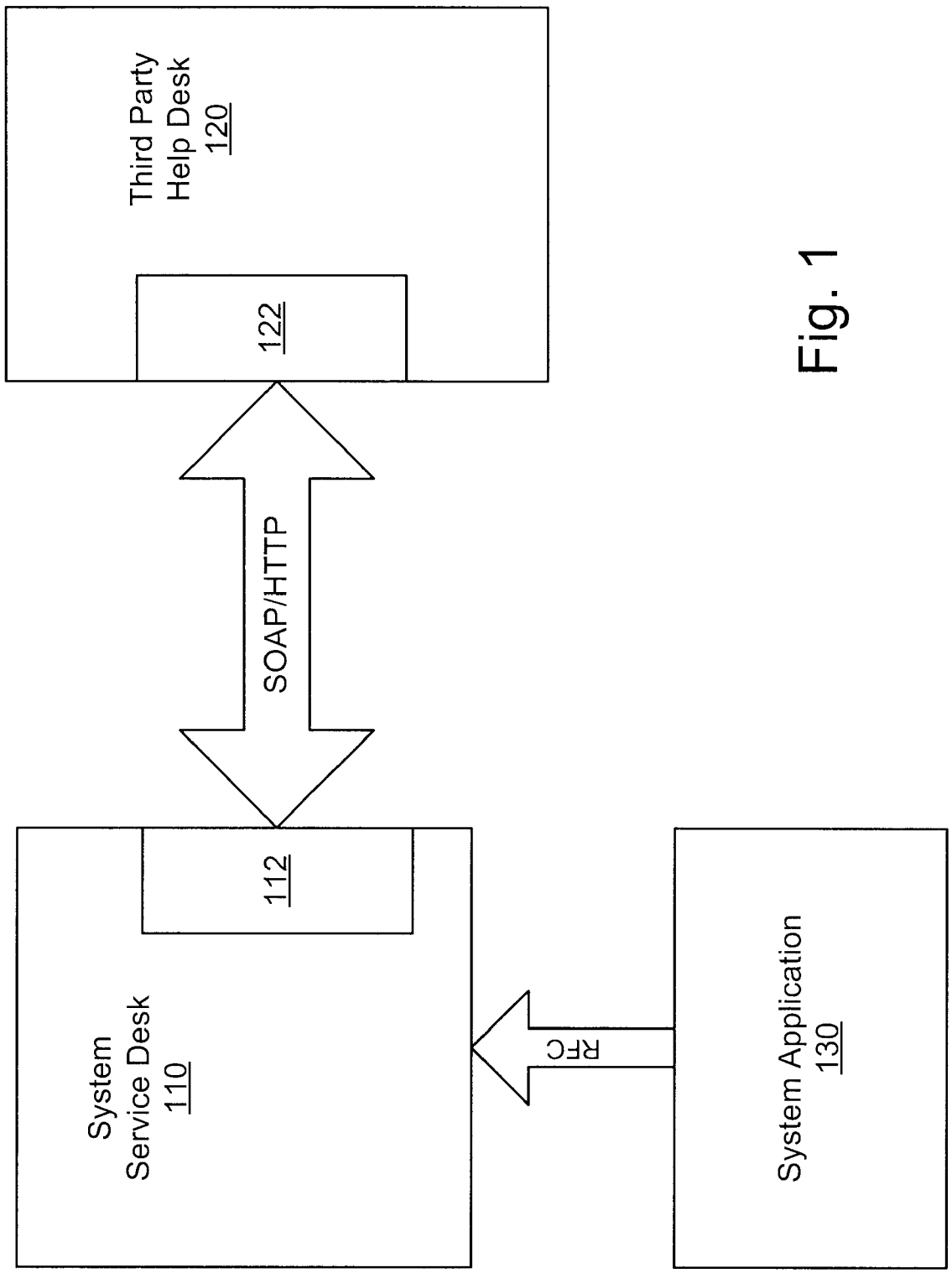
FIG. 1 is a block diagram illustrating communication between help desk systems and applications.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

In various embodiments, incidents are managed using help desks. An "incident" refers to any event which is not part of the standard operation of a service and which causes, or may cause, an interruption or a reduction of the quality of the service. Incidents can include at least the following classifications:

Application
service not available
application bug
disk-usage threshold exceeded
Hardware
system-down
automatic alert
printer not printing
Service requests
request for information/advice/documentation
forgotten password When an incident notification is received at a help desk, an incident record is generated. Incident records can be generated automatically by the help desk or they can be generated based on input received from a user (e.g., system administrator, etc.). An incident record includes incident data and a unique identification (ID) for the record. Incident data can include text statements, attachments (e.g., screen shots, files, documents, etc.), contact information and the like.

Incident data can be forwarded as a message to other help desks. Forwarding a message into another help desk creates a corresponding record there. Each message includes the unique record ID, which creates a link between the two records. In other words, the exchange of messages (using the unique record ID) allows both the original incident record in the first help desk and the corresponding record in the second help desk to maintain the same incident data and/or information.

In some embodiments, only delta information is exchanged between help desks involved in a message exchange associated with a particular record ID. In other words, a help desk only sends data that has been captured (i.e., new data) in that help desk since the last message exchange. In this way, redundant information is not exchanged between help desks.

The exchange of messages between help desks is facilitated by a bi-directional web services interface. The interface is platform-independent and can be integrated into existing help desk applications. The interface is based upon the following web services standards: eXtensible Markup Language (XML), Simple Object Access Protocol (SOAP), Web Service Definition Language (WSDL), and Universal Description, Discovery, and Integration (UDDI). SOAP is an eXtensible Markup Language (XML) based message envelope format with bindings to underlying protocols. In some embodiments, the primary protocol is Hypertext Transfer Protocol (HTTP). Other protocols such as secure HTTP (HTTPS), Simple Mail Transfer Protocol (SMTP), Extensible Messaging and Presence Protocol (XMPP), etc., can be used in other embodiments. The web services interface can be implemented in hardware in some embodiments (e.g., an ASIC, in firmware, etc.).

Processing of a record can occur automatically or it can be user-controlled. Between records that share a unique record ID, only one record can be processed at any given time. Thus, corresponding incident records are assigned a status and only one record can have the "processing" status at a time. Status can be switched multiple times between records at different help desks during the life of an incident record. Initially, status assignments are made at the help desk where the incident record was originally created. Once initial statuses have been assigned, the help desk with the record having the processing status is able to re-assign the processing status to a corresponding record maintained at a different help desk.

In some embodiments, closing an incident record in one help desk automatically triggers closing of the corresponding record in the other help desk. An incident record can only be closed at/by the help desk where the incident record was originally created. For example, administrator A might generate an incident record in help desk A and send a message to help desk B where a corresponding record is generated by administrator B. As discussed above, the two records are linked by a unique record ID; in this case, the ID might be '1234.' Thus, only administrator A can close the record having the ID '1234.' Once the incident record having the ID '1234' in help desk A is closed, a trigger is automatically sent to help desk B to close the corresponding record with the ID '1234.'

FIG. 1 illustrates communication between help desk systems and applications. Shown are service desk 110 and third party help desk 120. As discussed previously, the terms "service desk" and "help desk" are used interchangeably herein to refer to any IT functionality associated with incident management. Therefore, while FIG. 1 illustrates a service desk and a help desk, other embodiments could include two help desks or two service desks or a different arrangement of a help desk and a service desk.

Service desk 110 includes web services interface 112. Web services interface 112 allows for service desk incident records to be accessed externally over a network by help desk 120. Likewise, web services interface 122 allows for help desk incident records to be accessed externally over a network by service desk 110. The web services are implemented using SOAP, which is an XML-based message envelope format with bindings to underlying protocols such as HTTP. Other protocols such as secure HTTP (HTTPS), Simple Mail Transfer Protocol (SMTP), Extensible Messaging and Presence Protocol (XMPP), etc., can be used in other embodiments.

In some embodiments, notification of a system incident is received from an application via a remote function call (RFC). An RFC is a call of a function module that runs in a different system to the calling program. Thus, in FIG. 1, application 130 calls a function module of service desk 110 to notify service desk 110 of an incident.

Figure 2:
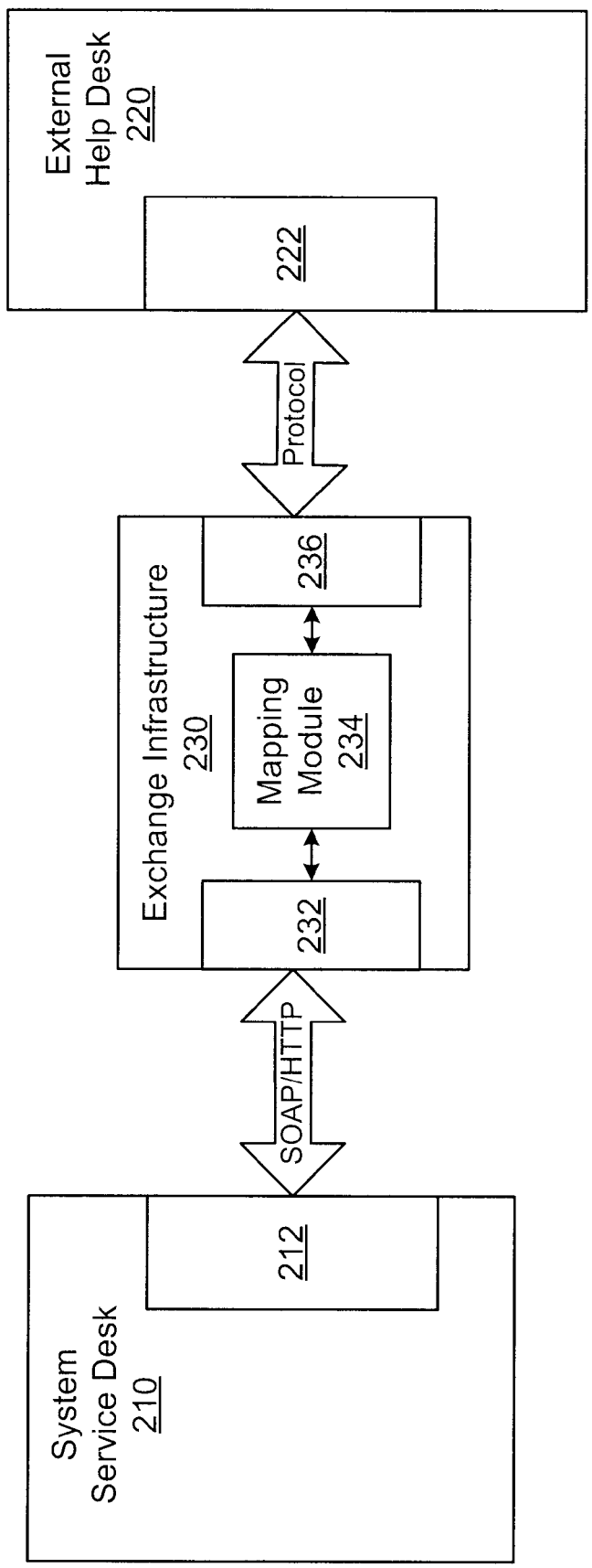
FIG. 2 is a block diagram illustrating an exchange infrastructure that facilitates communication between help desks.

FIG. 2 illustrates an exchange infrastructure that facilitates communication between service desk 210 and help desk 220. Exchange infrastructure 230 enables implementation of cross-system processes including connection of systems from different vendors in different versions and implemented in different programming languages.

Service desk 210 and exchange infrastructure 230 communicate via web services interfaces 212 and 232, respectively. In some embodiments, protocols used in the web services interfaces include SOAP and HTTP. Exchange infrastructure 230 also includes a standard interface 236 for communication with external help desk 220 via a standard protocol. Help desk 220 has its own interface 222 for communication with exchange infrastructure 236. Interface 222 and interface 212 do not need to match exactly in order to exchange messages because exchange infrastructure includes a mapping module 234 that maps the messages from help desk 220 and service desk 210 to each other. An example of an exchange infrastructure is the SAP XI exchange infrastructure offered by SAP AG of Walldorf, Germany.

Figure 3A:
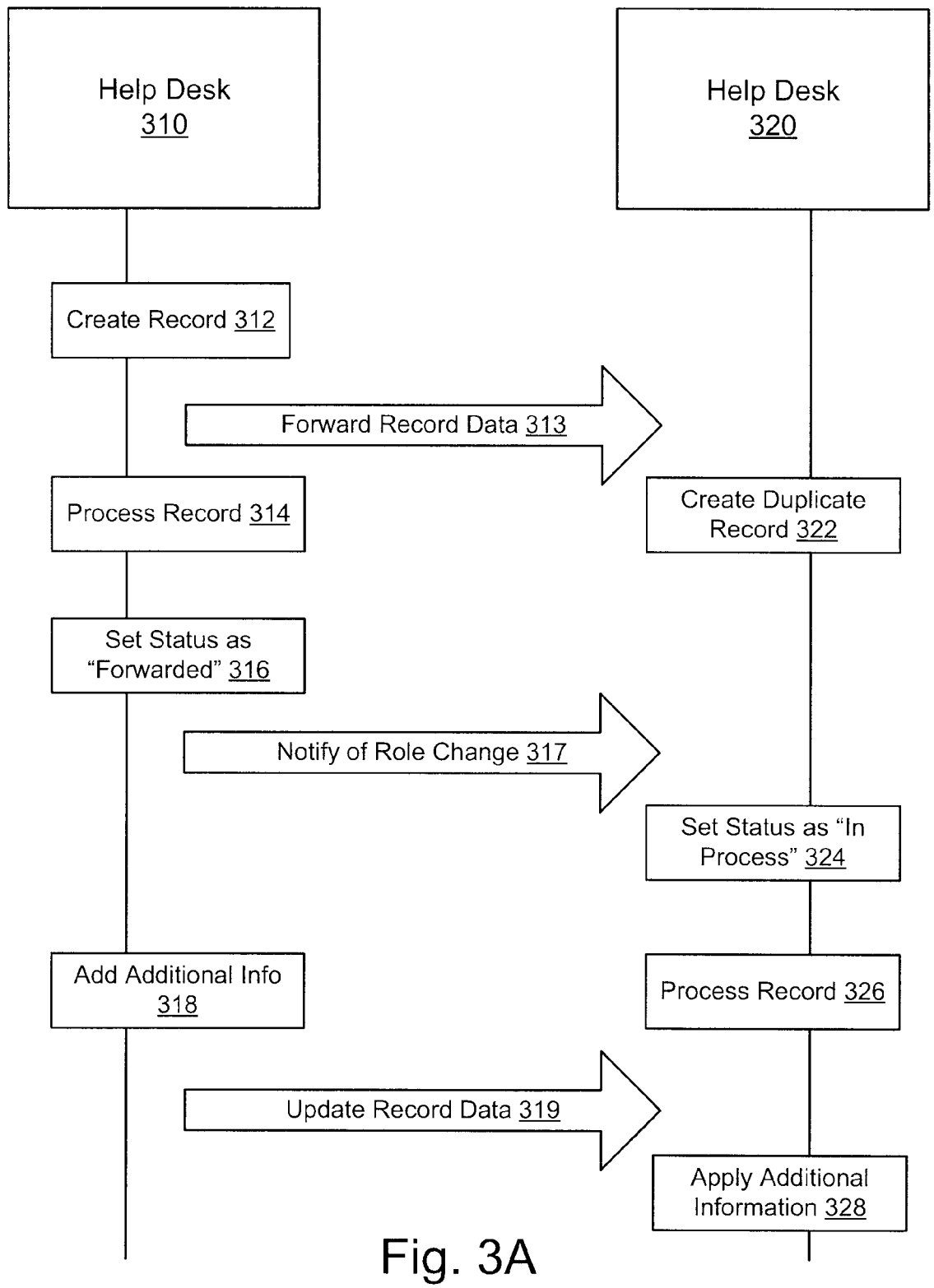
FIG. 3A is a block/flow diagram illustrating a process for exchanging incident record data between help desks.

FIG. 3A illustrates message (e.g., incident record data) exchange between two help desks. Again, the terms "help desk" and "service desk" can be used interchangeably in various embodiments. Help desk 310 creates an incident record 312 in response to receiving an indication of a system incident. A system incident can include application errors (e.g., service not available, application bug, disk-usage threshold exceeded, etc.), hardware errors (e.g., system crash, automatic alert, printer malfunction, etc.), service requests (e.g., request for info/advice/documentation, forgotten password, etc.) and the like.

Incident record data is forwarded 313 to help desk 320. Incident record data can include text statements (e.g., describing the incident), attachments (e.g., screen shots, Microsoft Word documents, Adobe PDF files, etc.), contact information and the like. Incident record data also includes a unique record ID for the incident record. The record ID is always included in any message exchange associated with an incident record. Incident record data can be forwarded to help desk 320 automatically upon creation of the incident record or it can be forwarded based on user (e.g., system administrator) action.

Help desk 320 creates a corresponding record 322 when it receives the incident record data from help desk 310. The corresponding record is essentially a duplicate of the original incident record only it is maintained at a different help desk (i.e., help desk 320). The two records are "linked" by the record ID.

FIG. 3A shows that the incident record is processed 314 after the record data is forwarded 313, but processing could begin before forwarding in other embodiments. Only one of the two records can be processed at a time. Thus, in some embodiments, the original incident record in help desk 310 is assigned a "processing" status when it is initially created. The term "processing" as used herein refers to the process of resolving the system incident. For example, if a system incident is an application error, processing the system incident involves finding a solution that fixes the application error.

Either help desk 310 or 320 can have the processing status but only one help desk can have the status at a time. When the status of the incident record at help desk 310 is changed to "Forwarded" 316, help desk 320 is notified of the status change 317. In response, the status of the corresponding record in help desk 320 is changed to "In Process." At that point, help desk 320 can process 326 the corresponding incident record.

While help desk 310 does not process the incident record if help desk 320 is processing the corresponding record, additional information can be added 318 to the incident record. Anytime additional information is added to an incident record at one help desk, that information is sent to the other help desk to update the corresponding record. Thus, the updated record data is sent 319 as a message to help desk 320, where the additional information is then incorporated into the corresponding record 328. The additional information can include text statements, attached files and/or documents, updated contact information, etc.

Figure 3B:
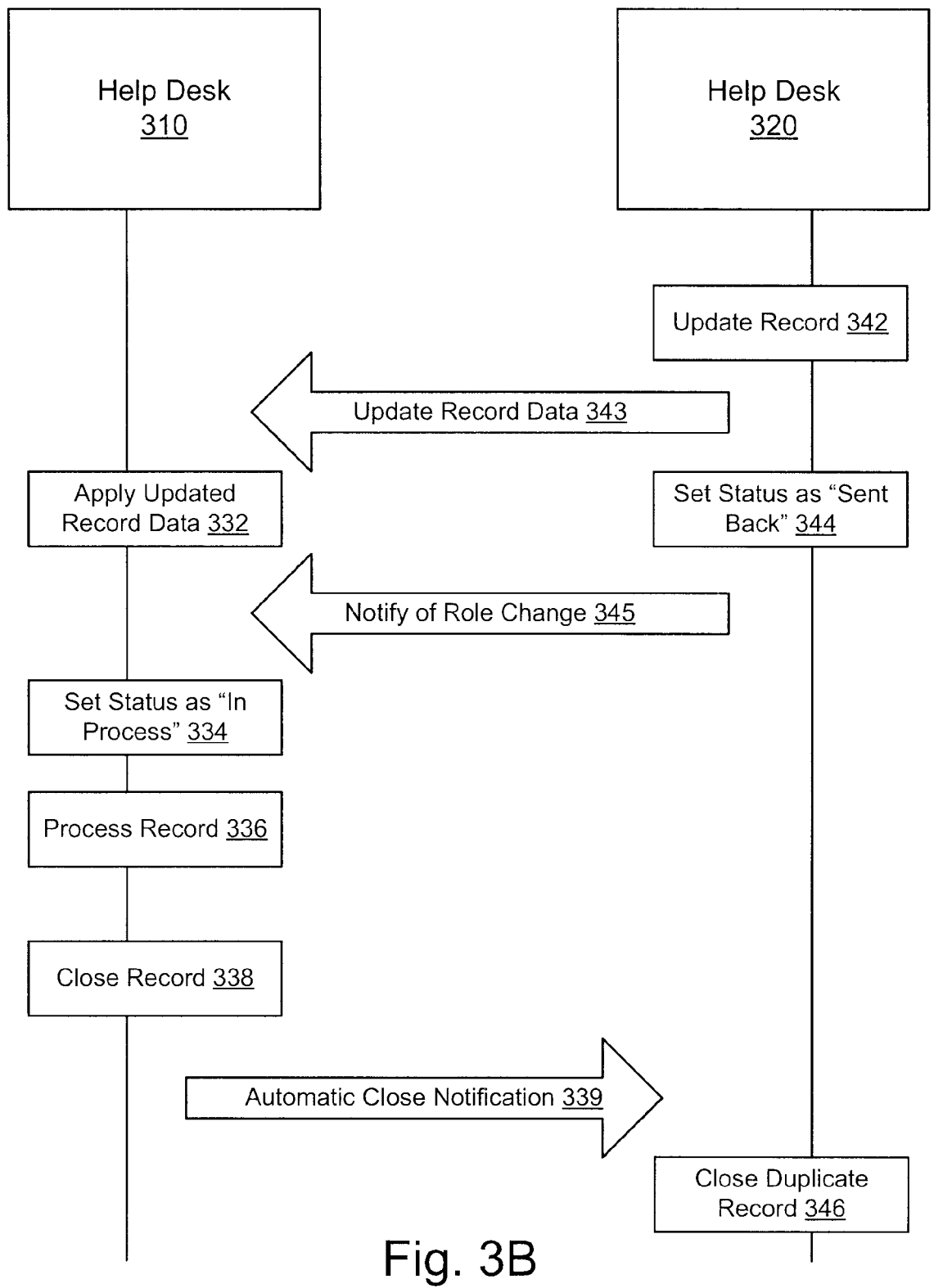
FIG. 3B is a block/flow diagram illustrating a process for exchanging incident record data between help desks.

FIG. 3B further illustrates message exchange between help desks 310 and 320. Just as help desk 310 can provide additional information to help desk 320 while help desk 320 has the processing status, help desk 320 can also update its incident record 342 and forward the updated record data 343 to help desk 310. Help desk 310 applies the updated record data 332 to the incident record upon receiving it.

When help desk 320 set the status of its record as "Sent Back" 344, it triggers a notification of status change 345 that is sent back to help desk 310. In some embodiments, help desk 320 may update record data 343 and notify help desk 310 of a status change 345 in a single message. As an example, an administrator at help desk 320 might find a potential solution that resolves the incident. Thus, the administrator could send the potential solution and a status change notification to help desk 310 so that an administrator at help desk 310 could process (e.g., verify) the solution.

Help desk 310 changes its record status to "In Process" upon receiving the notification of status change 344 and begins processing the incident record 336. Referring again to the example above, if the updated record data 343 includes a potential solution, then processing might involve verifying the solution. If the solution resolves the incident, then help desk 310 can close the incident record 338. Closing the incident record in help desk 310 automatically triggers a notification 339 to close the corresponding record 346.

Figure 4:
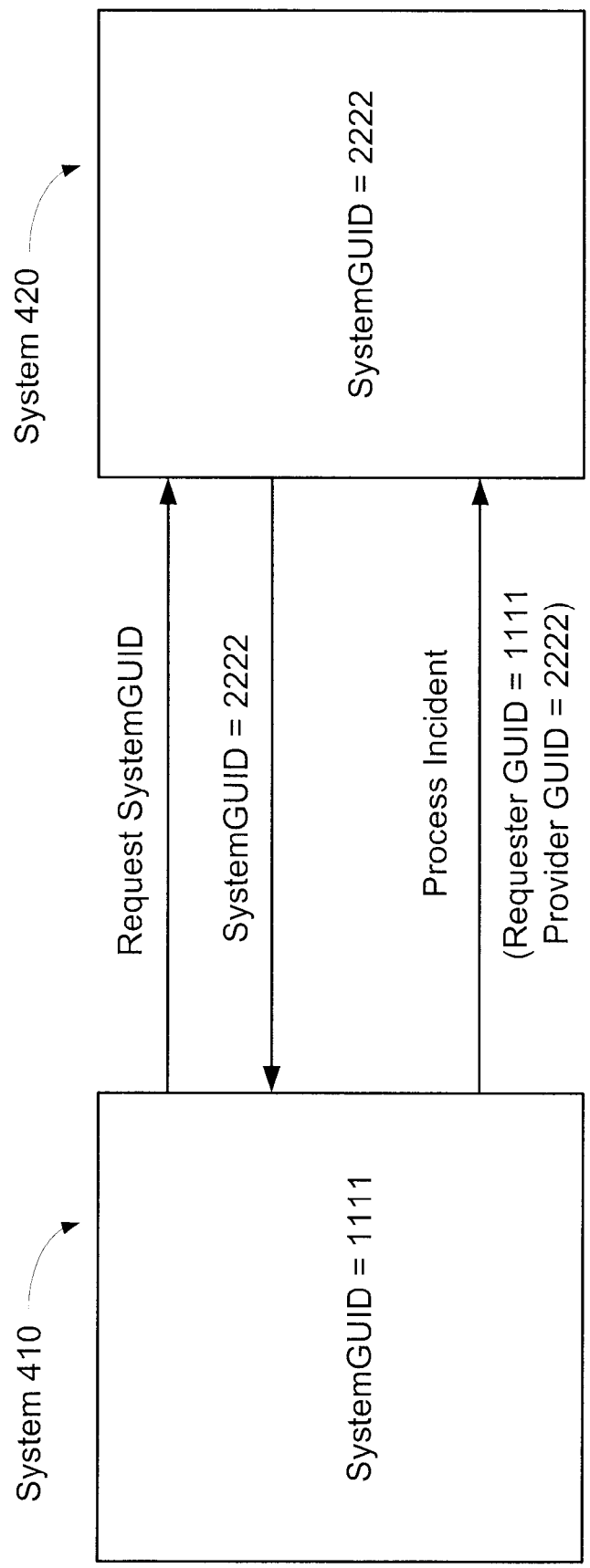
FIG. 4 illustrates assignment of record status between help desks according to some embodiments.

FIG. 4 illustrates in more detail the assignment of system status between help desks according to some embodiments. After configuration of the web services interface(s) between two systems (e.g., systems 410 and 420), system 410 calls system 420 requesting a globally unique ID (GUID). System 420 returns its GUID (GUID=2222) to system 410. System 410 assigns statuses based on the GUIDs. For example, in FIG. 4, system 410 assigns system 420 to process the incident. In this case, system 420 is assigned the provider status (ProviderGUID=2222) while system 410 get the requester status (RequesterGUID=1111). Thus, based on the status assignments, only one system (in this case, system 420) can be in a processing state at any given time.

Figure 5:
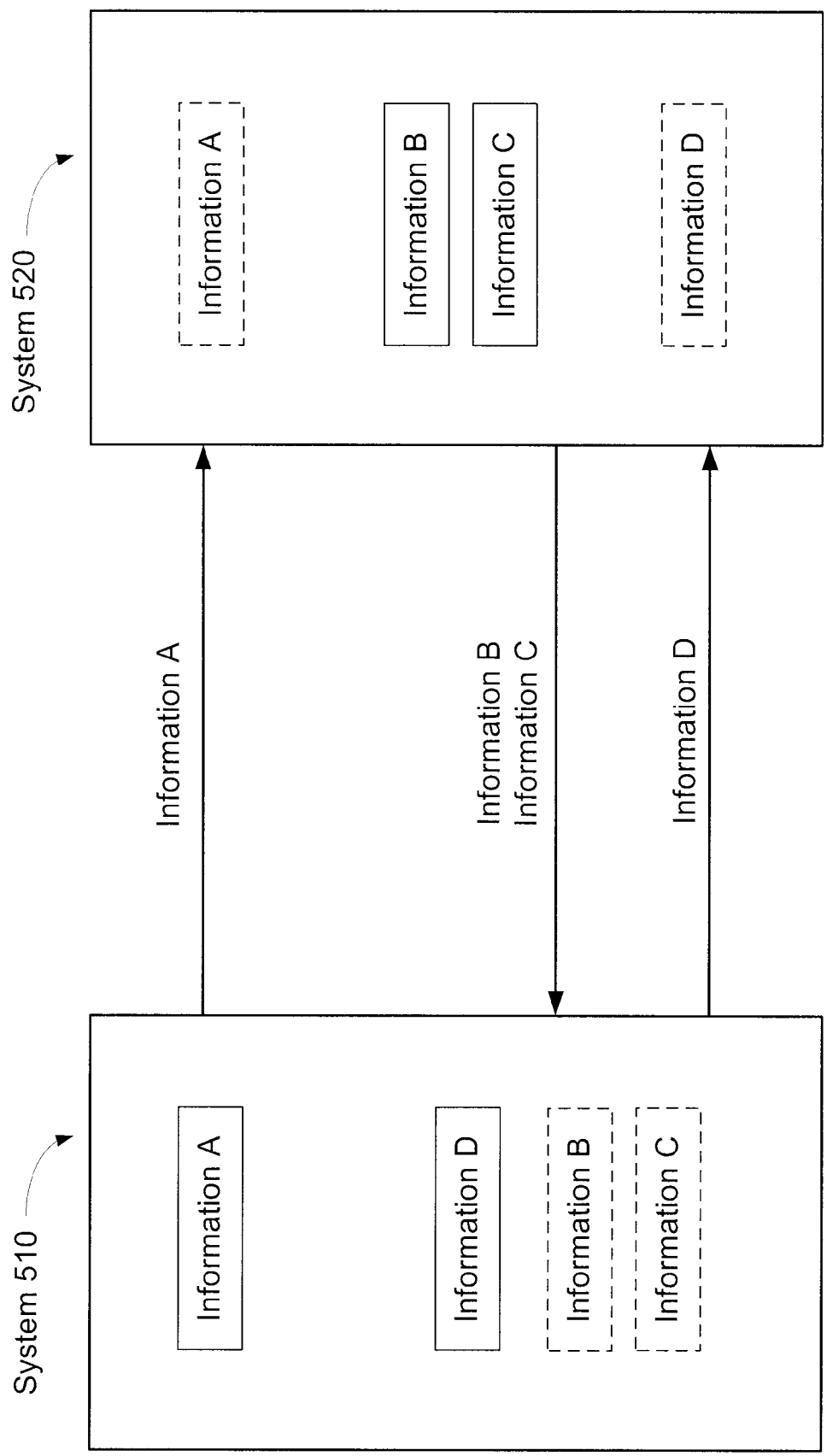
FIG. 5 illustrates the exchange of information between help desks according to some embodiments.

FIG. 5 illustrates the exchange of information between help desk systems. In some embodiments, only delta information is exchanged between records sharing a record ID. For example, when an incident record is initially created in system 510, the record might include information A (e.g., one or more text statements, attachments, files, contact information, etc.). Information A is then passed to system 520 and a corresponding record is created there. If information B and information C are subsequently added to the record in system 520, then the total information in the record includes information A, information B, and information C. However, given that only information B and information C are new since the last message exchange from system 510 to system 520, only information B and information C are sent back to system 510 in the subsequent message exchange. Meanwhile, information D is added to the incident record in system 510. Again, given that only information D is new since the last message exchange, only information D is sent back to system 520.

Embodiments of the invention may include various operations as set forth above. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Elements of the present invention may also be provided as a machine-readable medium (e.g., a computer readable medium) for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, or other type of media/machine-readable medium suitable for storing electronic instructions.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
   receiving notification of a system incident at a first help desk system, the incident indicating a problem with a system;
   generating and maintaining a first incident record for the system incident at the first help desk system, the first incident record having incident data and a unique record identification (ID);
   transmitting the first incident record from the first help desk system to a second help desk system to outsource the system incident to the second help desk system that is a remote third-party help desk system coupled to the first desk help system over a network, wherein outsourcing includes having the second help desk system serve as a service desk system to process the system incident to find a solution to the problem associated with the system incident, wherein the second help desk system generates and maintains a second incident record corresponding to the first incident record and including duplicate copies of the incident data and the unique record ID, wherein the first and second incident records are linked via the unique record ID;
   processing, at the second help desk system, the system incident to find the solution to the problem, and, once the solution is found, reporting the solution to the first help desk system;
   closing the first incident record at the first help desk system upon receiving the solution at the first desk system; and
   closing the second incident record at the second help desk system, responsive to the closing of the first incident record at the first help desk system.

2. The method of claim 1, wherein the incident data comprises one or more of a text statement, and attached file, and contact information.

3. The method of claim 1, wherein transmitting the first incident record from the first help desk system to the second help desk system comprises:
   accessing a web services interface of the second help desk system;
   requesting a globally unique ID (GUID) for the second help desk system;
   receiving the GUID from the second help desk system; and
   transmitting the first incident record to the second help desk system based, at least in part, on the GUID.

4. The computer-implemented method of claim 3, wherein the web services protocol is Simple Object Access Protocol (SOAP).

5. The computer-implemented method of claim 1, further comprising:
   exchanging additional information between the first help desk system and the second help desk system during processing of the system incident, based, at least in part, on the unique record ID.

6. The computer-implemented method of claim 5, wherein exchanging additional information between the first help desk system and the second help desk system comprises exchanging only information captured in the first help desk system with the second help desk system since the first help desk system last received information from the second help desk system.

7. The computer-implemented method of claim 5, wherein the additional information comprises at least one of a text statement and an attached file.

8. The computer-implemented method of claim 1, wherein the system incident is received from an application via a remote function call (RFC).

9. An article of manufacture comprising a computer-readable medium having content stored thereon to provide instructions to result in an electronic device performing operations including:
   receiving notification of a system incident at a first help desk system, the incident indicating a problem with a system;
   generating and maintaining a first incident record for the system incident at the first help desk system, the first incident record having incident data and a unique record identification (ID);
   transmitting the first incident unique record from the first help desk system to a second help desk system to outsource the system incident to the second help desk system that is a remote third-party help desk system coupled to the first desk help system over a network, wherein outsourcing includes having the second help desk system serve as a service desk system to process the system incident to find a solution to the problem associated with the system incident, wherein the second help desk system generates and maintains a second incident record corresponding to the first incident record and including duplicate copies of the incident data and the unique record ID, wherein the first and second incident records are linked via the unique record ID;
   processing, at the second help desk system, the system incident to find the solution to the problem, and, upon finding the solution at the second help desk system, reporting the solution to the first help desk system;
   closing the first incident record at the first help desk system upon receiving the solution at the first desk system; and
   closing the second incident record at the second help desk system, responsive to the closing of the first incident record at the first help desk system.

10. The article of manufacture of claim 9, wherein the incident data comprises one or more of a text statement, and attached file, and contact information.

11. The article of manufacture of claim 9, wherein the instructions that cause the electronic device to transmit the first incident record from the first help desk system to the second help desk system comprise further instructions including:
    accessing a web services interface of the second help desk system;
    requesting a globally unique ID (GUID) for the second help desk system;
    receiving the GUID from the second help desk system; and
    transmitting the first incident record to the second help desk system based, at least in part, on the GUID.

12. The article of manufacture of claim 11, wherein the web services protocol is Simple Object Access Protocol (SOAP).

13. The article of manufacture of claim 9, comprising content to provide instructions to result in the electronic device performing further operations including:
    exchanging additional information between the first help desk system and the second help desk system during processing of the system incident, based, at least in part, on the unique record ID.

14. The article of manufacture of claim 13, wherein exchanging additional information between the first help desk system and the second help desk system comprises exchanging only information captured in the first help desk system with the second help desk system since the first help desk system last received information from the second help desk system.

15. The article of manufacture method of claim 13, wherein the additional information comprises at least one of a text statement and an attached file.

16. The article of manufacture of claim 9, wherein the system incident is received from an application via a remote function call (RFC).

17. A system, comprising:
 a first help desk system to receive notification of a system incident, the incident indicating a problem with a system;
 the first help desk system to generate and maintain a first incident record for the system incident, the first incident record having incident data and a unique record identification (ID);
 the first help desk system is further to transmit the first incident record from the first help desk system to a second help desk system to outsource the system incident to the second help desk system that is a remote third-party help desk system coupled to the first desk help system over a network, wherein outsourcing includes having the second help desk system serve as a service desk system to process the system incident to find a solution to the problem associated with the system incident, wherein the second help desk system generates and maintains a second incident record corresponding to the first incident record and including duplicate copies of the incident data and the unique record ID, wherein the first and second incident records are linked via the unique record ID;
 the second help desk system to process the system incident to find the solution to the problem, and, upon finding the solution at the second desk system, report the solution to the first help desk system; and
 the first help desk system to close the first incident record upon receiving the solution from the second help desk system, wherein closing the first incident record automatically triggers closing of the second incident record at the second help desk system.

18. The system of claim 17, wherein the incident data comprises one or more of a text statement, and attached file, and contact information.

19. The system of claim 17, the first help desk system is further to:
 access a web services interface of the second help desk system;
 request a globally unique ID (GUID) for the second help desk system;
 receive the GUID from the second help desk system; and
 transmit the first incident record to the second help desk system based, at least in part, on the GUID.

20. The system of claim 17, further comprising:
 an interface at the first help desk to exchange additional information between the first help desk system and the second help desk system during processing of the system incident, based, at least in part, on the unique record ID, the additional information comprising only information captured in the first help desk system with the second help desk system since the first help desk system last received information from the second help desk system.

* * * * *